United States Patent
Sakabe et al.

(10) Patent No.: US 10,023,712 B2
(45) Date of Patent: Jul. 17, 2018

(54) HEAT-EXPANDABLE MICROSPHERES, PROCESS FOR PRODUCING THE SAME AND APPLICATION THEREOF

(71) Applicant: MATSUMOTO YUSHI-SEIYAKU CO., LTD., Yao-shi, Osaka (JP)

(72) Inventors: Koichi Sakabe, Yao (JP); Katsushi Miki, Yao (JP); Yasuyuki Nomura, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 0 days.

(21) Appl. No.: 15/311,742

(22) PCT Filed: May 18, 2015

(86) PCT No.: PCT/JP2015/064141
§ 371 (c)(1),
(2) Date: Nov. 16, 2016

(87) PCT Pub. No.: WO2015/178329
PCT Pub. Date: Nov. 26, 2015

(65) Prior Publication Data
US 2017/0081492 A1 Mar. 23, 2017

(30) Foreign Application Priority Data
May 23, 2014 (JP) ................. 2014-107254

(51) Int. Cl.
| | | |
|---|---|---|
| C08J 9/16 | (2006.01) | |
| C08J 9/18 | (2006.01) | |
| C08J 9/20 | (2006.01) | |
| C08F 2/18 | (2006.01) | |
| C08F 220/00 | (2006.01) | |
| B01J 13/18 | (2006.01) | |
| C08J 9/00 | (2006.01) | |
| C08J 9/14 | (2006.01) | |
| C08J 9/228 | (2006.01) | |
| C08F 220/14 | (2006.01) | |
| C08J 9/32 | (2006.01) | |

(52) U.S. Cl.
CPC ............... C08J 9/20 (2013.01); B01J 13/18 (2013.01); B01J 13/185 (2013.01); C08F 2/18 (2013.01); C08F 220/00 (2013.01); C08F 220/14 (2013.01); C08J 9/0061 (2013.01); C08J 9/141 (2013.01); C08J 9/16 (2013.01); C08J 9/228 (2013.01); C08J 9/32 (2013.01); C08J 2201/024 (2013.01); C08J 2203/14 (2013.01); C08J 2323/06 (2013.01); C08J 2331/04 (2013.01); C08J 2333/12 (2013.01); C08J 2423/08 (2013.01); C08J 2431/04 (2013.01); C08J 2433/12 (2013.01)

(58) Field of Classification Search
CPC ... C08J 9/20; C08J 9/0061; C08J 9/141; C08J 9/228; C08J 9/32
See application file for complete search history.

(56) References Cited

U.S. PATENT DOCUMENTS

| | | | |
|---|---|---|---|
| 3,615,972 | A | 10/1971 | Morehouse, Jr. et al. |
| 5,010,114 | A | 4/1991 | Liang et al. |
| 2003/0018102 | A1 | 1/2003 | Weston et al. |
| 2007/0154711 | A1* | 7/2007 | Masuda ............ B01J 13/04 428/402.22 |
| 2007/0219281 | A1 | 9/2007 | Ejiri et al. |
| 2009/0176098 | A1* | 7/2009 | Masuda ............ B01J 13/14 428/407 |
| 2009/0256107 | A1 | 10/2009 | Hentze et al. |
| 2009/0292031 | A1 | 11/2009 | Ejiri |
| 2010/0204349 | A1 | 8/2010 | Inohara et al. |
| 2011/0166242 | A1 | 7/2011 | Kawaguchi et al. |
| 2013/0085192 | A1 | 4/2013 | Yamauchi et al. |

FOREIGN PATENT DOCUMENTS

| | | |
|---|---|---|
| JP | 2011-016884 A | 1/2011 |
| JP | 2012-122025 A | 6/2012 |
| JP | 2012-513487 A | 6/2012 |
| JP | 2014-080616 A | 5/2014 |
| WO | 2006/030946 A1 | 3/2006 |
| WO | 2009/050863 A1 | 4/2009 |
| WO | 2010/072663 A1 | 7/2010 |
| WO | 2014/196625 A1 | 12/2014 |

OTHER PUBLICATIONS

International Search Report of PCT/JP2015/064141 dated Aug. 18, 2015.
Communication dated Feb. 19, 2018 from the Swedish Patent and Registration Office in corresponding Swedish application No. 1651694-0.

* cited by examiner

*Primary Examiner* — Kara B Boyle
(74) *Attorney, Agent, or Firm* — Sughrue Mion, PLLC (57) ABSTRACT

Heat-expandable microspheres having an almost spherical shape and high expansion performance and exhibiting good workability when mixed with a resin, a process for producing the heat-expandable microspheres, and applications thereof. The heat-expandable microspheres include a thermoplastic resin shell and a blowing agent encapsulated therein and vaporizable by heating. The thermoplastic resin is produced by polymerizing a polymerizable component containing a methacrylate monomer and a carboxyl-containing monomer, and optionally containing a nitrile monomer in an amount ranging from 0 to 30 parts by weight to 100 parts by weight of the total amount of the methacrylate monomer and the carboxyl-containing monomer. The blowing agent contains a hydrocarbon having at least 8 carbon atoms per molecule.

12 Claims, 1 Drawing Sheet

HEAT-EXPANDABLE MICROSPHERES, PROCESS FOR PRODUCING THE SAME AND APPLICATION THEREOF

CROSS-REFERENCE TO RELATED APPLICATIONS

This application is a National Stage of International Application No. PCT/JP2015/064141 filed May 18, 2015, claiming priority based on Japanese Patent Application No. 2014-107254 filed May 23, 2014, the contents of all of which are incorporated herein by reference in their entirety.

BACKGROUND OF THE INVENTION

Technical Field

The present invention relates to heat-expandable microspheres, the process for producing the same and application thereof.

Background Art

Heat-expandable microspheres composed of a thermoplastic resin shell and a blowing agent encapsulated therein are generally called heat-expandable microcapsules. The monomers constituting the thermoplastic resin usually include vinylidene chloride, (meth)acrylonitrile monomers, and (meth)acrylate monomers. The blowing agent mainly used includes hydrocarbons such as isobutane and isopentane (refer to PTL 1).

The vapor pressure of the blowing agent, i.e., a hydrocarbon, may change due to the heat generated at the polymerization step in the production process of the heat-expandable microspheres. The change in the vapor pressure may cause expansion and/or compaction of the heat-expandable microspheres being polymerized, and thus may make the shell of microspheres nonspherical, in other words, concave or distorted.

Such concave heat-expandable microspheres have a lower packing efficiency than that of spherical heat-expandable microspheres, and cannot be uniformly mixed with a resin or may flow out of the mixture when the microspheres are mixed with the resin to be prepared into a resin composition, such as a masterbatch. Thus, a sufficient amount of heat-expandable microspheres cannot be mixed with the resin resulting in considerably poor workability of the materials in the preparation of a resin composition.

In addition, heat-expandable microspheres having concave or distorted shapes do not expand sufficiently because the pressure by the blowing agent is not applied uniformly to the shells of the microspheres. Such concave or distorted heat-expandable microspheres in a resin composition are subjected to nonuniform shear stress when the resin composition is processed in extrusion molding, injection molding, calendering or pressure forming where the composition is subjected to high pressure. The nonuniform shear stress imparted to the heat-expandable microspheres may break the heat-expandable microspheres such that the microspheres are poorly expandable in the molding of the resin composition.

Thus there is a strong demand for heat-expandable microspheres having a improved sphericity for solving the problems mentioned above.

PATENT LITERATURE

[PTL 1] U.S. Pat. No. 3,615,972

SUMMARY OF THE INVENTION

The present invention aims to provide heat-expandable microspheres having an almost spherical shape, expanding sufficiently and exhibiting good workability when mixed with a resin, a process for producing the same, and applications thereof.

As a result of diligent study, the present inventors found that heat-expandable microspheres comprising a thermoplastic resin shell produced by polymerizing a specific polymerizable component and a blowing agent containing a specific hydrocarbon and encapsulated in the shell could solve the above mentioned problems to thereby achieve the present invention.

Namely, the above objects of the present invention have been achieved by providing heat-expandable microspheres comprising a thermoplastic resin shell and a blowing agent encapsulated therein and vaporizable by heating. The thermoplastic resin is produced by polymerizing a polymerizable component essentially containing a methacrylate monomer and a carboxyl-containing monomer, and optionally containing a nitrile monomer in an amount ranging from 0 to 30 parts by weight to 100 parts by weight of the total amount of the methacrylate monomer and the carboxyl-containing monomer. The blowing agent contains a hydrocarbon having at least 8 carbon atoms per molecule.

The heat-expandable microspheres preferably satisfy at least one of the following requirements (1) to (5).

(1) The heat-expandable microspheres have a compressibility index that is lower than 25%.

(2) A gel fraction of the heat-expandable microspheres after being immersed in DMF for 72 hours is not higher than 90%.

(3) The amount of the methacrylate monomer ranges from 40 to 85 wt % of the total amount of the methacrylate monomer and the carboxyl-containing monomer.

(4) The heat-expandable microspheres have a maximum expansion temperature of at least 100° C.

(5) A yellowing index, ΔYI, of the heat-expandable microspheres after heating at 180° C. for 10 min is not higher than 30.

In a second aspect, the present invention provides a process for producing the heat-expandable microspheres which comprises: dispersing an oily mixture containing a polymerizable component, a blowing agent and a polymerization initiator in an aqueous dispersion medium and polymerizing the polymerizable component, wherein the polymerizable component contains a methacrylate monomer and a carboxyl-containing monomer, and optionally contains a nitrile monomer in an amount ranging from 0 to 30 parts by weight to 100 parts by weight of the total amount of the methacrylate monomer and the carboxyl-containing monomer, and the blowing agent contains a hydrocarbon having at least 8 carbon atoms per molecule.

The process for producing the heat-expandable microspheres preferably satisfies at least one of the following requirements (A) to (C).

(A) The amount of the polymerization initiator ranges from 0.9 to 10 parts by weight to 100 parts by weight of the total amount of the methacrylate monomer and the carboxyl-containing monomer.

(B) The amount of the methacrylate monomer ranges from 40 to 85 wt % of the total amount of the methacrylate monomer and the carboxyl-containing monomer.

(C) The amount of a cross-linking agent in the polymerizable component ranges from 0 to 0.4 parts by weight to 100 parts by weight of the total amount of the methacrylate monomer, the carboxyl-containing monomer and the nitrile monomer.

In a third aspect, the present invention provides hollow particles produced by thermally expanding the heat-expandable microspheres and/or the heat-expandable microspheres produced in the process for producing heat-expandable microspheres.

In a fourth aspect, the present invention provides a composition containing a base component and at least one particulate material selected from the group consisting of the heat-expandable microspheres, the heat-expandable microspheres produced in the process for producing heat-expandable microspheres, and the hollow particles.

In a fifth aspect, the present invention provides a formed product produced by forming the composition, and preferably exhibits a yellowing index, $\Delta YI$, not higher than 30.

Advantageous Effects of Invention

The heat-expandable microspheres of the present invention have an almost spherical shape and high expansion performance, and exhibit good workability when mixed with a resin.

The process for producing heat-expandable microspheres of the present invention efficiently produces heat-expandable microspheres having an almost spherical shape and high expansion performance, and exhibiting good workability when mixed with a resin.

The hollow particles of the present invention have an almost spherical shape and exhibit good workability when mixed with a resin as well as the heat-expandable microspheres of the present invention.

The composition of the present invention foams sufficiently and exhibits good workability when processed into a product.

The formed product of the present invention produced of the heat-expandable microspheres of the present invention is sufficiently lightweight.

REFERENCE SYMBOLS

Reference symbols used to identify various features in the drawings include the following.
11 Shell of thermoplastic resin
12 Blowing agent
1 Hollow particles (fine-particle-coated hollow particles)
2 Shell
3 Hollow
4 Fine particle (in a state of adhesion)
5 Fine particle (in a state of fixation in a dent)

DETAILED DESCRIPTION OF THE PREFERRED EMBODIMENTS

The invention will next be described in greater detail with reference to the drawings. However, the present invention should not be construed as being limited thereto.

Process for Producing Heat-Expandable Microspheres

The process for producing heat-expandable microspheres of the present invention includes the steps of dispersing an oily mixture containing a polymerizable component, a blowing agent and a polymerization initiator in an aqueous dispersion medium, and polymerizing the polymerizable component (hereinafter also referred to as the polymerization step).

The polymerizable component is polymerized into a thermoplastic resin which forms the shell of the heat-expandable microspheres. The polymerizable component contains a monomer component as an essential component, and may contain a cross-linking agent. The monomer component is a radically-polymerizable monomer having a polymerizable double bond, and is polymerizable through addition reaction. The cross-linking agent is a radically-polymerizable monomer having a plurality of polymerizable double bonds, and introduces cross-links into the thermoplastic resin.

The monomer component of the polymerizable component contains, as essential components, a methacrylate monomer and a carboxyl-containing monomer.

The methacrylate monomer is not specifically restricted, and includes, methyl methacrylate, ethyl methacrylate, n-butyl methacrylate, isobutyl methacrylate, t-butyl methacrylate, 2-ethylhexyl methacrylate, isodecyl methacrylate, n-lauryl methacrylate, n-stearyl methacrylate, butoxydiethyleneglycol methacrylate, isobornyl methacrylate, cyclohexyl methacrylate, tetrahydrofurfuryl methacrylate, phenoxyethyl methacrylate, benzyl methacrylate, β-carboxyethyl methacrylate, diethyleneglycol ethoxyl methacrylate, 2-hydroxyethyl methacrylate, 2-hydroxypropyl methacrylate, 2-methacryloyloxyethyl-2-hydroxyethyl phthalate and glycidyl methacrylate. Of those monomers, methyl methacrylate is preferable for high expansion performance of the resultant heat-expandable microspheres.

The carboxyl-containing monomer is not specifically restricted except that the monomer should contain at least one free carboxyl group per molecule. The carboxyl-containing monomer include unsaturated monocarboxylic acids, such as acrylic acid, methacrylic acid, ethacrylic acid, crotonic acid and cinnamic acid; unsaturated dicarboxylic acids, such as maleic acid, itaconic acid, fumaric acid, citraconic acid and chloromaleic acid; anhydrides of unsaturated dicarboxylic acids; and monoesters of unsaturated dicarboxylic acids, such as monomethyl maleate, monoethyl maleate, monobutyl maleate, monomethyl fumarate, monoethyl fumarate, monomethyl itaconate, monoethyl itaconate and monobutyl itaconate. One of or a combination of at least two of those carboxyl-containing monomers may be employed. A part of or the whole of the carboxyl groups in the carboxyl-containing monomers may be neutralized during or after the polymerization. Of those carboxyl-containing monomers, acrylic acid, methacrylic acid, maleic acid, maleic acid anhydride and itaconic acid are preferable, acrylic acid and methacrylic acid are more preferable, and methacrylic acid is further more preferable for imparting improved heat resistance of the resultant heat-expandable microspheres.

The amount of the methacrylate monomer is not specifically restricted, and should preferably range from 40 to 85 wt % of the total amount of the methacrylate monomer and the carboxyl-containing monomer, more preferably from 45 to 80 wt %, further more preferably from 50 to 75 wt %, and most preferably from 55 to 70 wt %. An amount of the methacrylate monomer lower than 40 wt % of the total amount of the methacrylate monomer and the carboxyl-containing monomer may result in concave heat-expandable microspheres exhibiting poor workability and low expansion performance when mixed with a resin. On the other hand, an amount of the methacrylate monomer higher than 85 wt % may cause poor heat-resistance of the resultant heat-expandable microspheres.

The total amount of the methacrylate monomer and the carboxyl-containing monomer is not specifically restricted and should preferably be higher than 70 wt % of the total amount of the polymerizable component, more preferably higher than 80 wt % and further more preferably higher than 90 wt %. The preferable upper limit of the total amount of the methacrylate monomer and the carboxyl-containing monomer is 100 wt % of the total amount of the polymerizable component. If the total amount is 70 wt % or lower, the resultant heat-expandable microspheres have concave shapes and exhibit poor workability and low expansion performance when mixed with a resin.

The polymerizable component may contain another monomer component polymerizable with the methacrylate monomer and the carboxyl-containing monomer. Such monomer component includes, for example, nitrile monomers such as acrylonitrile, methacrylonitrile, α-chloroacrylonitrile, α-ethoxyacrylonitrile and fumaronitrile; vinyl halide monomers, such as vinyl chloride; vinylidene halide monomers, such as vinylidene chloride; vinyl ester monomers, such as vinyl acetate, vinyl propionate and vinyl butyrate; acrylate monomers, such as methyl acrylate, ethyl acrylate, n-butyl acrylate, t-butyl acrylate, 2-ethylhexyl acrylate, stearyl acrylate, phenyl acrylate, isobornyl acrylate, cyclohexyl acrylate, benzyl acrylate, and 2-hydroxyethyl acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts.

The amount of the nitrile monomer in the polymerizable component should range from 0 to 30 parts by weight to 100 parts by weight of the total amount of the methacrylate monomer and the carboxyl-containing monomer, preferably from 0 to 20 parts by weight, more preferably from 0 to 10 parts by weight, further more preferably from 0 to 5 parts by weight, and most preferably be 0 parts by weight. An amount of the nitrile monomer higher than 30 parts by weight to 100 parts by weight of the total amount of the methacrylate monomer and the carboxyl-containing monomer results in concave heat-expandable microspheres which exhibit poor workability and low expansion performance when mixed with a resin.

The glass transition temperature (Tg) of the homopolymer of the monomer component is sometimes used as the indicator for selecting the monomer component. Of those monomer components, a preferable monomer component should be polymerized into a homopolymer having a Tg higher than 40° C., more preferably higher than 50° C., further more preferably higher than 60° C. and most preferably higher than 70° C. in order to produce, from the monomer component, heat-expandable microspheres of almost spherical shape and high expansion performance.

The monomer component polymerized into a homopolymer having a Tg higher than 40° C. is not specifically restricted, and includes, for example, acrylonitrile, methacrylonitrile, α-chloroacrylonitrile, α-ethoxyacrylonitrile, fumaronitrile, vinyl chloride, t-butyl acrylate, stearyl acrylate, phenyl acrylate, isobornyl acrylate, 2-hydroxyethyl acrylate, methyl methacrylate, ethyl methacrylate, isobutyl methacrylate, t-butyl methacrylate, isobornyl methacrylate, cyclohexyl methacrylate, tetrahydrofurfuryl methacrylate, benzyl methacrylate, 2-hydroxyethyl methacrylate, glycidyl methacrylate, acrylamide, methacrylamide, N-phenyl maleimide, N-cyclohexyl maleimide, styrene, N-vinyl carbazole, N-vinyl pyrolidone, vinyl naphthalene salts, acrylic acid, methacrylic acid, ethacrylic acid, crotonic acid, cinnamic acid, maleic acid, itaconic acid, fumaric acid, citraconic acid, chloromaleic acid, monomethyl maleate, monoethyl maleate, monobutyl maleate, monomethyl fumarate, monoethyl fumarate, monomethyl itaconate, monoethyl itaconate, and monobutyl itaconate. Of those monomer components, t-butyl acrylate, stearyl acrylate, phenyl acrylate, isobornyl acrylate, 2-hydroxyethyl acrylate, methyl methacrylate, ethyl methacrylate, isobutyl methacrylate, t-butyl methacrylate, isobornyl methacrylate, cyclohexyl methacrylate, tetrahydrofurfuryl methacrylate, benzyl methacrylate, 2-hydroxyethyl methacrylate, glycidyl methacrylate, acrylamide, methacrylamide, N-phenyl maleimide, N-cyclohexyl maleimide, styrene, N-vinyl carbazole, N-vinyl pyrolidone, vinyl naphthalene salts, acrylic acid, methacrylic acid, ethacrylic acid, crotonic acid, cinnamic acid, maleic acid, itaconic acid, fumaric acid, citraconic acid, chloromaleic acid, monomethyl maleate, monoethyl maleate, monobutyl maleate, monomethyl fumarate, monoethyl fumarate, monomethyl itaconate, monoethyl itaconate, and monobutyl itaconate are preferable. The heat-expandable microspheres produced by polymerizing the polymerizable component containing those monomer components are preferable for their low yellowing index.

The glass transition temperatures of homopolymers polymerized from several monomers are described in "POLYMER HANDBOOK, third edition, J. Bradrup and E. H. Immergut, Ed., JOHN WILEY & SONS, Inc. 1989." For example, polymethylmethacrylate has the Tg of 105° C., polyethylmethacrylate has the Tg of 65° C., polyacrylic acid has the Tg of 106° C., polymethacrylic acid has the Tg of 228° C., polyacrylonitrile has the Tg of 125° C., polymethacrylonitrile has the Tg of 120° C., and polyacrylamide has the Tg of 165° C.

A monomer component polymerized into a homopolymer having a Tg lower than 40° C. may result in concave heat-expandable microspheres having a low expansion performance if such monomer component is used as the polymerizable component. On the other hand, a monomer component polymerized into a homopolymer having a Tg higher than 250° C. may result in heat-expandable microspheres having a low expansion performance.

As mentioned above, the polymerizable component may contain a cross-linking agent. The polymerizable component polymerized with the cross-linking agent will control the decrease of the ratio of the blowing agent retained in thermally expanded microspheres (retention ratio of a blowing agent encapsulated in microspheres) and achieve efficient thermal expansion of the microspheres.

The cross-linking agent is not specifically restricted, and includes, for example, aromatic divinyl compounds, such as divinylbenzene; and polyfunctional (meth)acrylate compounds, such as allyl methacrylate, triacrylformal, triallyl isocyanate, ethylene glycol di(meth)acrylate, diethylene glycol di(meth)acrylate, 1,4-butanediol di(meth)acrylate, 1,9-nonanediol di(meth)acrylate, PEG (200) di(meth)acrylate, PEG (600) di(meth)acrylate, trimethylolpropane trimethacrylate, pentaerythritol tri(meth)acrylate, dipentaerythritol hexaacrylate, 2-butyl-2-ethyl-1,3-propanediol diacrylate, and tricyclodecane dimethanol di(meth)acrylate. One of or a combination of at least two of those cross-linking agents may be used.

The amount of the cross-linking agent, which is optionally used, is not specifically restricted, and preferably ranges from 0 to 0.4 parts by weight to 100 parts by weight of the total amount of the methacrylate monomer, the carboxyl-containing monomer and the nitrile monomer, more preferably from 0.02 to 0.3 parts by weight, and further more preferably from 0.04 to 0.2 parts by weight. An amount of the cross-linking agent greater than 0.4 parts by weight may result in concave heat-expandable microspheres having a compressibility index higher than 20% which exhibit poor workability when mixed with a resin.

The blowing agent is vaporizable by heating and encapsulated in the shell of the heat-expansive microspheres to make the entire body of a heat-expandable microsphere thermally expansive (the property with which the entire body of a heat-expandable microsphere expands by heating).

The blowing agent contains, as an essential component, a hydrocarbon having at least 8 carbon atoms per molecule. The hydrocarbon having at least 8 carbon atoms per molecule includes, for example, straight-chain hydrocarbons, such as octane, nonane, decane, dodecane, tridecane, tetradecane, pentadecane, hexadecane, heptadecane, octadecane and nonadecane; branched hydrocarbons, such as isooctane, isononane, isodecane, isododecane, 3-methyl undecane, isotridecane, 4-mehtyl dodecane, isotetradecane, isopentadecane, isohexadecane, 2, 2, 4, 4, 6, 8, 8-heptamethylnonane, isoheptadecane, isooctadecane, isononadecane, and 2, 6, 10, 14-tetramethyl pentadecane; alicyclic hydrocarbons, such as cyclododecane, cyclotridecane, hexylcyclohexane, heptylcyclohexane, n-octylcyclohexane, cyclopentadecane, nonylcyclohexane, decylcyclohexane, pentadecylcyclohexane, hexadecylcyclohexane, heptadecylcyclohexane and octadecylcyclohexane. The hydrocarbons having at least 8 carbon atoms per molecule preferably have a boiling point not lower than 100° C. in order to raise the maximum expansion temperature of the resultant heat-expandable microspheres.

The blowing agent may also contain other types of blowing agents in addition to the hydrocarbon having at least 8 carbon atoms per molecule. Other types of blowing agents include, for example, $C_3$-$C_7$ hydrocarbons, such as propane, (iso)butane, (iso)pentane, (iso)hexane and (iso)heptane; petroleum ethers; halides of the petroleum ethers; fluorine-containing compounds, such as hydrofluoroether; tetraalkyl silane; and compounds which thermally decompose to generate gases.

The blowing agent may be any of straight-chain, branched or alicyclic compounds, and preferably is an aliphatic compound.

The amount of the hydrocarbon having at least 8 carbon atoms per molecule is preferably at least 20 wt % of the whole of the blowing agent, more preferably at least 30 wt %, and further more preferably at least 40 wt %. The preferable upper limit of the amount of the hydrocarbon having at least 8 carbon atoms per molecule is 80 wt %. A blowing agent containing the hydrocarbon having at least 8 carbon atoms per molecule in an amount lower than 20 wt % may result in excessive vapor pressure of the hydrocarbons during the polymerization to make the resultant heat-expandable microspheres concave. On the other hand, a blowing agent containing the hydrocarbon having at least 8 carbon atoms per molecule in an amount higher than 80 wt % may result in insufficient vapor pressure of the blowing agent in the resultant heat-expandable microspheres to decrease the expansion ratio of the microspheres.

In the process of the present invention, an oily mixture containing the polymerizable component, the blowing agent and a polymerization initiator is used in order to polymerize the polymerizable component in the presence of the polymerization initiator.

The polymerization initiator is not specifically restricted, and includes peroxides generally used, for example, peroxydicarbonates, such as diisopropyl peroxydicarbonate, di-sec-butyl peroxydicarbonate, di-(2-ethylhexyl) peroxydicarbonate and dibenzyl peroxydicarbonate; diacyl peroxides, such as lauroyl peroxide and benzoyl peroxide; ketone peroxides, such as methylethyl ketone peroxide and cyclohexanone peroxide; peroxyketals, such as 2,2-bis(t-butylperoxy)butane; hydroperoxides, such as cumene hydroperoxide and t-butyl hydroperoxide; dialkyl peroxides, such as dicumyl peroxide and di-t-butyl peroxide; peroxyesters, such as t-hexyl peroxypivalate and t-butyl peroxyisobutylate.

The azo compound includes, for example, 2,2'-azobis(4-methoxy-2,4-dimethyl valeronitrile), 2,2'-azobisisobutyloni-trile, 2,2'-azobis(2,4-dimethyl valeronitrile), 2,2'-azobis(2-methyl propionate), and 2,2'-azobis(2-methyl butylonitrile).

The amount of the polymerization initiator preferably ranges from 0.9 to 10 parts by weight to 100 parts by weight of the polymerizable component, more preferably from 1.2 to 9 parts by weight, and most preferably from 1.5 to 8 parts by weight. An amount of the polymerization initiator lower than 0.9 parts by weight to 100 parts by weight of the polymerizable component may result in concave heat-expandable microspheres having low expansion ratio and high compressibility index which leads to poor workability of the microspheres when mixed with a resin. An amount of the polymerization initiator higher than 10 parts by weight to 100 parts by weight of the polymerizable component may cause low heat-resistance of the resultant heat-expandable microspheres.

The amount of the polymerization initiator preferably ranges from 0.9 to 10 parts by weight to 100 parts by weight of the total amount of the methacrylate monomer and the carboxyl-containing monomer, more preferably from 1.2 to 9 parts by weight, and most preferably from 1.5 to 8 parts by weight. An amount of the polymerization initiator lower than 0.9 parts by weight may result in concave heat-expandable microspheres having a low expansion ratio and high compressibility index which leads to poor workability when the microspheres are mixed with a resin. An amount of the polymerization initiator higher than 10 parts by weight may cause low heat-resistance of the resultant heat-expandable microspheres.

In the process of the present invention, the oily mixture is dispersed in the aqueous dispersion medium to be prepared into an aqueous suspension, and the polymerizable component is polymerized.

The aqueous dispersion medium contains water, such as deionized water, as the main component to disperse the oily mixture. The medium may further contain alcohols, such as methanol, ethanol and propanol, and hydrophilic organic solvents, such as acetone. The hydrophilic property as used herein means a property of a substance or mixture optionally miscible in water. The amount of the aqueous dispersion medium used in the process is not specifically restricted, and preferably ranges from 100 to 1000 parts by weight to 100 parts by weight of the polymerizable component.

The aqueous dispersion medium may further contain an electrolyte, such as sodium chloride, magnesium chloride, calcium chloride, sodium sulfate, magnesium sulfate, ammonium sulfate, and sodium carbonate. One of or a combination of at least two of these electrolytes may be used. The amount of the electrolyte is not specifically restricted, and preferably ranges from 0.1 to 50 parts by weight to 100 parts by weight of the aqueous dispersion medium.

The aqueous dispersion medium may contain at least one water-soluble compound selected from the group consisting of potassium dichromate, alkali metal nitrite salts, metal (III) halides, boric acid, water-soluble ascorbic acids, water-soluble polyphenols, water-soluble vitamin Bs, water-soluble phosphonic acids and phosphonate salts, and water-soluble 1,1-substitution compounds having a carbon atom bonded with a hetero atom and with a hydrophilic functional group selected from the group consisting of hydroxyl group, carboxylic acid (salt) group and phosphonic acid (salt) group. The term "water-soluble" as used herein means a property of a substance soluble in an amount of at least 1 g in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound may fail to exert a sufficient effect by the water-soluble compound. On the other hand, an excessive amount of the water-soluble compound may decrease the polymerization rate or increase the amount of the residue of the polymerizable component constituting the microspheres.

The aqueous dispersion medium may contain a dispersion stabilizer or a dispersion stabilizing auxiliary in addition to the electrolytes and the water-soluble compounds.

The dispersion stabilizer is not specifically restricted, and includes, for example, calcium triphosphate; magnesium pyrophosphate and calcium pyrophosphate produced by double reaction; colloidal silica; alumina sol; and magnesium hydroxide. One of or a combination of at least two of those dispersion stabilizers may be used.

The amount of the dispersion stabilizer preferably ranges from 0.1 to 20 parts by weight to 100 parts by weight of the polymerizable component, and more preferably from 0.5 to 10 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of those dispersion stabilizing auxiliaries may be used.

The aqueous dispersion medium is prepared by blending a water-soluble compound and optionally a dispersion stabilizer and/or a dispersion stabilizing auxiliary with water (deionized water). The pH of the aqueous dispersion medium during polymerization is adjusted depending on the variants of the water-soluble compound, the dispersion stabilizer, and the dispersion stabilizing auxiliary.

The polymerization in the process of the present invention may be carried out in the presence of sodium hydroxide or the combination of sodium hydroxide and zinc chloride.

In the process of the present invention, the oily mixture is dispersed and emulsified in the aqueous dispersion medium to be formed into oil globules of a prescribed particle size.

The methods for dispersing and suspending the oily mixture include generally known dispersion techniques, such as agitation with a Homo-mixer (for example, a device produced by Tokushu Kika Kogyou Co., Ltd.), dispersion with a static dispersing apparatus such as a Static mixer (for example, a device produced by Noritake Engineering Co., Ltd.), membrane suspension technique, and ultrasonic dispersion.

Then suspension polymerization is started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be set optionally depending on the variant of the polymerization initiator, and is preferably controlled within the range from 30 to 100° C., and more preferably from 40 to 90° C. The polymerization temperature is preferably maintained for about 0.1 to 20 hours. The initial pressure for the polymerization is not specifically restricted, and is preferably controlled within the range from 0 to 5.0 MPa in gauge pressure, and more preferably from 0.1 to 3.0 MPa.

Heat-Expandable Microspheres

Figure 1:
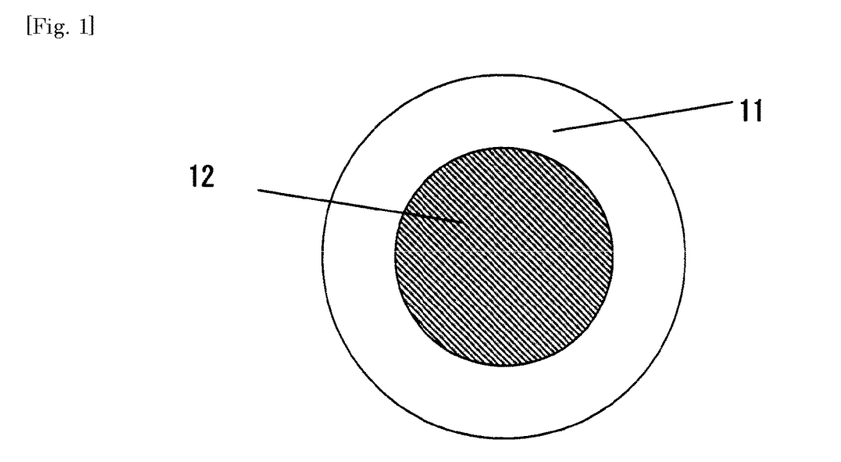
FIG. 1 is a schematic diagram of an example of the heat-expandable microspheres.

The heat-expandable microspheres, as shown in FIG. 1, are composed of the shell 11 of a thermoplastic resin and a blowing agent (core) 12 encapsulated therein and vaporizable by heating. The heat-expandable microspheres have a core-shell structure, and the entire body of a heat-expandable microsphere is thermally expansive (the property with which the entire body of a heat-expandable microsphere expands by heating). The thermoplastic resin, the polymerizable component to be polymerized into the thermoplastic resin, the monomer component and the cross-linking agent constituting the polymerizable component, and the blowing agent are as described above.

The mean particle size of the heat-expandable microspheres is not specifically restricted, and preferably ranges from 1 to 100 µm, more preferably from 3 to 80 µm, further more preferably from 7 to 60 µm, and most preferably from 10 to 50 µm. The heat-expandable microspheres having a mean particle size smaller than 1 µm may have a low expansion performance. On the other hand, the heat-expandable microspheres having a mean particle size greater than 100 µm may have low packing efficiency and exhibit poor workability when mixed with a resin.

The coefficient of variation, CV, of the particle size distribution of the heat-expandable microspheres is not specifically restricted, and is preferably not greater than 35%, more preferably not greater than 30%, and most preferably not greater than 25%. The CV can be calculated by the following expressions (1) and (2).

[Math. 1]

$$CV = (s/\langle x \rangle) \times 100(\%) \quad (1)$$

$$s = \left\{ \sum_{i=1}^{n} (xi - \langle x \rangle)^2 / (n-1) \right\}^{1/2} \quad (2)$$

(where s is a standard deviation of the particle size of the microspheres, $\langle x \rangle$ is a mean particle size of the microspheres, "xi" is the particle size of the i-th particle, and n represents the number of particles)

The encapsulation ratio of the blowing agent is defined as the weight percentage of the blowing agent to the weight of the heat-expandable microspheres in which the blowing agent is encapsulated. The encapsulation ratio of the blowing agent is not specifically restricted, and preferably ranges from 1 to 60 wt % of the weight of the heat-expandable microspheres, more preferably from 3 to 50 wt %, further more preferably from 8 to 40 wt %, and most preferably from 10 to 30 wt %.

The expansion-initiation temperature (Ts) of the heat-expandable microspheres is not specifically restricted, and is preferably at least 90° C., more preferably at least 100° C., further more preferably at least 110° C., yet further more preferably at least 120° C., and most preferably at least 130° C. The upper limit of the expansion-initiation temperature is preferably 200° C. Heat-expandable microspheres having an expansion-initiation temperature lower than 90° C. may have insufficient heat resistance which causes their low expansion performance. On the other hand, heat-expandable microspheres having an expansion-initiation temperature higher than 200° C. may have a high maximum expansion temperature which results in their low expansion performance.

The maximum expansion temperature (Tm) of the heat-expandable microspheres is not specifically restricted, and is preferably at least 100° C., more preferably at least 110° C., further more preferably at least 120° C., yet further more preferably at least 130° C., and most preferably at least 140° C. Heat-expandable microspheres having a maximum expansion temperature lower than 100° C. may have insufficient heat resistance. On the other hand, heat-expandable microspheres having a maximum expansion temperature higher than 300° C. may not expand to a sufficient expansion ratio.

The heat-expandable microspheres of the present invention have a high maximum expansion temperature and high heat resistance, and are preferable for injection molding and the like.

The maximum expansion ratio of the heat-expandable microspheres is not specifically restricted, and is preferably at least 20 times, more preferably at least 30 times, yet more preferably at least 40 times, further more preferably at least 50 times, yet further more preferably at least 60 times, and most preferably at least 70 times. On the other hand, the upper limit of the maximum expansion ratio is preferably 200 times. The heat-expandable microspheres having a maximum expansion ratio lower than 20 times may insufficiently expand a formed product containing the microspheres. On the other hand, the heat-expandable microspheres having a maximum expansion ratio higher than 200 times may impart a rough surface to the formed product containing the microspheres.

The compressibility index of the heat-expandable microspheres indicates the degree of filling the space of an aggregate by the heat-expandable microspheres, and is calculated from the tapped bulk density of the heat-expandable microspheres (the bulk density of the microspheres after a specified compaction process) and the loose bulk density of the heat-expandable microsphere (the bulk density of the microspheres freely settled) as described in the following examples. The compressibility index of the heat-expandable microspheres is negatively correlated to the workability of the heat-expandable microspheres mixed with a resin. In other words, the heat-expandable microspheres having higher compressibility index have a lower packing efficiency and exhibit poorer workability when mixed with a resin.

The compressibility index of the heat-expandable microspheres is not specifically restricted, and is preferably lower than 25%, more preferably lower than 20%, yet more preferably lower than 18%, further more preferably lower than 16%, yet further more preferably lower than 14%, still further preferably lower than 12% and most preferably lower than 10%. The heat-expandable microspheres having a 25% or higher compressibility index may have a concave shape and the shell may be nonuniformly pressurized by the blowing agent in heating to result in insufficient expansion of the microspheres. In addition, the concave heat-expandable microspheres have a low packing efficiency and may exhibit poor workability when mixed with a resin.

The "gel fraction" of the heat-expandable microspheres indicates the solvent resistance of the thermoplastic resin constituting the shell of the microspheres, and is calculated from the weight of the heat-expandable microspheres after immersing the heat-expandable microspheres in DMF for 72 hours and removing the supernatant liquid containing dissolved microspheres to leave undissolved microspheres gelled by DMF as described in the following examples.

The gel fraction of the heat-expandable microspheres is not specifically restricted, and is preferably not higher than 90%, more preferably not higher than 85%, yet more preferably not higher than 80%, further more preferably not higher than 75%, yet further more preferably not higher than 70%, still further more preferably not higher than 65% and most preferably not higher than 60%. The heat-expandable microspheres resulting in a gel fraction higher than 90% have a rigid thermoplastic shell which disrupts the thermal expansion of the microspheres.

The yellowing index, $\Delta YI$, of the heat-expandable microspheres indicates the heat resistance of the thermoplastic resin constituting the shell of the microspheres. The yellowing index is calculated by subtracting the yellowness index of the standard specimen (YI0) from the yellowness index of a sample of the heat-expandable microspheres (YI) which is measured after heating the sample at 180° C. for 10 min.

The yellowing index, $\Delta YI$, of the heat-expandable microspheres is preferably not higher than 30, more preferably not higher than 25, yet more preferably not higher than 20, further more preferably not higher than 15, yet further more preferably not higher than 10 and most preferably not higher than 5. The heat-expandable microspheres which result in a yellowing index higher than 30 may cause coloration of the formed product containing the heat-expandable microspheres.

Hollow Particles

The hollow particles of the present invention are produced by heating and expanding the heat-expandable microspheres and the heat-expandable microspheres produced in the process described above. The hollow particles are lightweight and exhibit excellent properties in a composition or formed product.

The process for producing the hollow particles includes dry thermal expansion methods and wet thermal expansion methods. The thermal expansion temperature preferably ranges from 80° C. to 350° C.

The mean particle size of the hollow particles is not specifically restricted, and can be optionally designed according to the application of the particles. The mean particle size preferably ranges from 0.1 to 1000 μm, and more preferably from 0.8 to 200 μm. The coefficient of variation, CV, of the particle size distribution of the hollow particles is not specifically restricted, and preferably is not higher than 30%, and more preferably not higher than 25%.

The true specific gravity of the hollow particles is not specifically restricted, and preferably ranges from 0.010 to 0.5, more preferably from 0.015 to 0.3 and most preferably from 0.020 to 0.2.

The yellowing index, $\Delta YI$, of the hollow particles is not specifically restricted, and is preferably not higher than 30, more preferably not higher than 25, yet more preferably not higher than 20, further more preferably not higher than 15, yet further more preferably not higher than 10 and most preferably not higher than 5. The hollow particles which result in a yellowing index higher than 30 may cause coloration of the formed product containing the hollow particles. The yellowing index, ΔYI, of the hollow particles is determined in the same manner as that for the yellowing index of the heat-expandable microspheres as described in the following examples.

Figure 2:
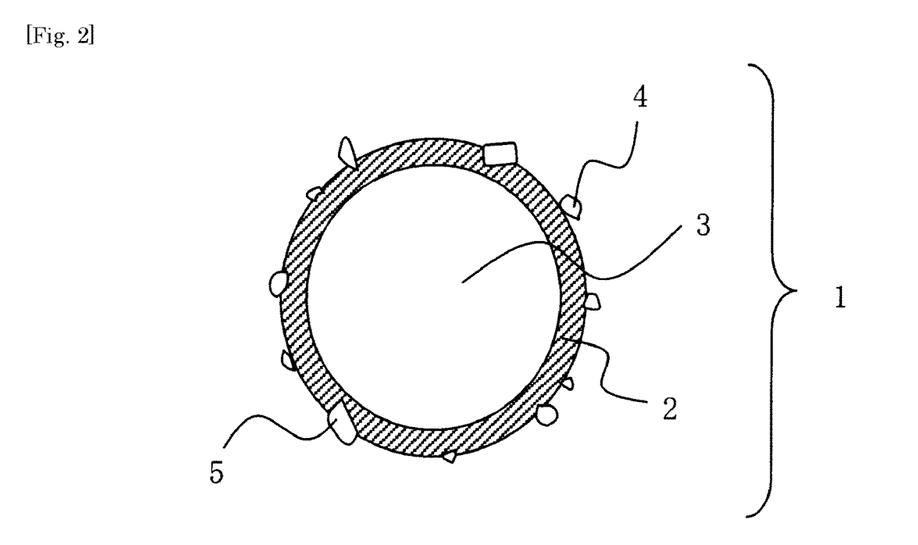
FIG. 2 is a schematic diagram of an example of the hollow particles.

The hollow particles (1) may include fine particles (4 and 5) coating the outer surface of their shell (2) as shown in FIG. 2, and such hollow particles are hereinafter also referred to as fine-particle-coated hollow particles (1).

The coating referred to herein mean that the particulate filler, i.e., fine particles (4 or 5) is in a state of adhesion (4) on the shell (2) of the hollow particles (1), or in a state of fixation in a dent (5) of the shell of the hollow particles as a result of the particulate filler pushing into the thermoplastic shell melted by heat. The particle shape of the particulate filler may be irregular or spherical. The fine-particle-coated hollow particles have improved workability.

The mean particle size of the fine particles is not specifically restricted, and is selected depending on the hollow particles to be coated. The mean particle size of the fine particles preferably ranges from 0.001 to 30 μm, more preferably from 0.005 to 25 μm, and most preferably from 0.01 to 20 μm.

The fine particles of various materials including both inorganic and organic materials may be employed. The shape of the fine particles includes spherical, needle-like and plate-like shapes.

The fine particles include, for example, organic fine particles including metal soaps such as magnesium stearate, calcium stearate, zinc stearate, barium stearate and lithium stearate; synthetic waxes, such as polyethylene wax, lauric amide, myristic amide, palmitic amide, stearic amide and hydrogenated castor oil; and organic fillers, such as polyacrylamide, polyimide, nylon, polymethylmethacrylate, polyethylene and polytetrafluoroethylene. Examples of inorganic fine particles include talc, mica, bentonite, sericite, carbon black, molybdenum disulfide, tungsten disulfide, carbon fluoride, calcium fluoride and boron nitride; and other inorganic fillers, such as silica, alumina, isinglass, colloidal calcium carbonate, heavy calcium carbonate, calcium hydroxide, calcium phosphate, magnesium hydroxide, magnesium phosphate, barium sulfate, titanium dioxide, zinc oxide, ceramic beads, glass beads, and crystal beads.

The mean particle size of the fine particles is preferably not greater than 10% of the mean particle size of the fine-particle-coated hollow particles. The mean particle size referred to herein is the mean particle size of the primary particles.

The fine-particle-coated hollow particles are useful for preparing a paint composition or adhesive composition by blending the hollow particles in the compositions described below.

The fine-particle-coated hollow particles can be produced by heating and expanding the fine-particle-coated heat-expandable microspheres. The preferable process for producing the fine-particle-coated hollow particles includes the steps of blending heat-expandable microspheres and fine particles (blending step), and heating the mixture prepared in the blending step at a temperature higher than the softening point mentioned above to expand the heat-expandable microspheres and simultaneously adhere the fine particles on the outer surface of the shell of the resultant hollow particles (adhering step).

The true specific gravity of the fine-particle-coated hollow particles is not specifically restricted, and preferably ranges from 0.01 to 0.5, more preferably from 0.03 to 0.4, further more preferably from 0.05 to 0.35, and most preferably from 0.07 to 0.30. The fine-particle-coated hollow particles having a true specific gravity of less than 0.01 may have poor durability. On the other hand, the fine-particle-coated hollow particles having a true specific gravity of greater than 0.5 may have a poor performance to decrease the specific gravity of compositions containing the hollow particles and may not be cost-effective because a greater amount of the hollow particles is required in the compositions.

Compositions and Formed Products

The composition of the present invention contains at least one particulate material selected from the group consisting of the heat-expandable microspheres of the present invention, the heat-expandable microspheres produced in the process of the present invention and the hollow particles of the present invention, and a base component.

The base component is not specifically restricted, and includes, for example, rubbers, such as natural rubber, butyl rubber, silicone rubber, and ethylene-propylene-diene rubber (EPDM); thermosetting resins, such as epoxy resins and phenol resins; waxes, such as polyethylene waxes and paraffin waxes; thermoplastic resins, such as ethylene-vinyl acetate copolymer (EVA), polyethylene, polypropylene, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66 etc.), polycarbonate, polyethylene terephthalate (PET), polybutylene terephthalate (PBT), polyacetal (POM) and polyphenylene sulfide (PPS); ionomer resins, such as ethylene ionomers, urethane ionomers, styrene ionomers, and fluorine ionomers; thermoplastic elastomers, such as olefin elastomers and styrene elastomers; bioplastics, such as polylactic acid (PLA), cellulose acetate, PBS, PHA and starch resins; sealing materials, such as modified silicones, polyurethanes, polysulfides, acrylates, silicones, polyisobutylenes and butyl rubbers; paint components, such as urethane polymers, ethylene-vinyl acetate copolymers, vinyl chloride polymers and acrylate polymers; and inorganic materials, such as cement, mortar and cordierite.

The composition of the present invention is prepared by mixing these base components and the heat-expandable microspheres and/or hollow particles.

Applications of the composition of the present invention include, for example, molding compositions; paint compositions, clay compositions, fiber compositions, adhesive compositions and powder compositions.

The composition of the present invention can be used as the master batch for resin molding if the composition contains the heat-expandable microspheres and a base component including the compounds and/or thermoplastic resins having a melting point lower than the expansion-initiation temperature of the heat-expandable microspheres (for example, waxes, such as polyethylene waxes and paraffin waxes; thermoplastic resins, such as ethylene-vinyl acetate copolymer (EVA), polyethylene, polypropylene, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET), and polybutylene terephthalate (PBT); ionomer resins, such as ethylene ionomers, urethane ionomers, styrene ionomers, and fluorine ionomers; and thermoplastic elastomers, such as olefin elastomers and styrene elastomers). The masterbatch composition for resin molding is preferably employed in injection molding, extrusion molding, and press molding for the purpose of introducing bubbles into molded products. Resins used for rein molding can be selected from the base component mentioned above without restriction, and include, for example, ethylene-vinyl acetate copolymer (EVA), polyethylene, polypropylene, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66, etc.), polycarbonate, polyethylene terephthalate (PET), polybutylene terephthalate (PBT), ionomer resins, polyacetal (POM), polyphenylene sulfide (PPS), olefin elastomers, styrene elastomers, polylactic acid (PLA), cellulose acetate, PBS, PHA, starch resins, natural rubbers, butyl rubbers, silicone rubbers, ethylene-propylene-diene rubbers (EPDM), and their mixtures. The composition may optionally contain known antioxidants, such as hindered phenol antioxidant, sulfuric antioxidant and phosphoric antioxidant; light stabilizers of hindered amines, triazoles, benzophenone, benzoates, nickel compounds and salicyl compounds; molecular weight regulators such as peroxides; organic or inorganic nucleophiles; neutralizers; antacids; antibacterial agents; fluorescent brighteners; inorganic fibers, such as glass fiber, carbon fiber, silica fiber and alumina fiber; wood powder; flame retardants; lubricants; colorants; inorganic fillers, such as carbon black, silica, powdered quarts, glass beads, powdered glass, calcium silicate, kaolin, talc, clay, diatomaceous earth, wollastonite, iron oxide, titanium oxide, zinc oxide, alumina, calcium carbonate and barium carbonate; hydrolysis inhibitors; antistatic agents; inorganic chemical blowing agents, such as ammonium bicarbonate, sodium bicarbonate and anhydrous sodium nitrate; organic chemical blowing agents, such as dinitrosopentamethylenetetramine, N, N'-dimethyl-N,N'-dinitrosoterephthalamide, benzenesulfonyl hydrazide, p,p'-oxybis(benzenesulfonyl hydrazide), and azodicarbonamide; blowing auxiliaries of urea compounds, organic acids and metal salts for the chemical blowing agents; and reinforcing fibers, such as glass fiber and carbon fiber.

The composition of the present invention containing the heat-expandable microspheres of the present invention, azodicarbonamide and a metal salt blowing auxiliary is suitable for resin molding where the final products are required to have sufficient whiteness with minimum coloration.

The formed product of the present invention can be produced by forming the composition. The formed product of the present invention includes, for example, molded products and coating films. The formed product of the present invention have improved lightweight effect, porosity, sound absorbing performance, thermal insulation, design potential, shock absorbing performance and strength, and low thermal conductivity and dielectric property.

The formed product of the present invention is preferably colored to a minimum degree in heat treatment at high temperature. The yellowing index, $\Delta YI$, of the formed product is preferably not higher than 30, more preferably not higher than 25, yet more preferably not higher than 20, further more preferably not higher than 15, yet further more preferably not higher than 10, and most preferably not higher than 5. The yellowing index, $\Delta YI$, of the formed product is determined in the same manner as that for the heat-expandable microspheres described in the following examples.

The formed product containing inorganic materials as the base component can be further burnt to be processed into ceramic filters and the like.

EXAMPLE

The examples of the heat-expandable microspheres of the present invention are specifically described below, though the present invention is not restricted within the scope of those examples. The percentage (%) mentioned in the following examples and comparative examples means weight percent (wt %) unless otherwise specified.

The properties of the heat-expandable microspheres, hollow particles, compositions, and formed products were measured and their performances were evaluated by the following methods. The heat-expandable microspheres may also be referred to as "microspheres" for concise expression.

Mean Particle Size and Particle Size Distribution

A sample of microspheres was analyzed in dry system of a laser diffraction particle size analyzer (HEROS & RODOS, manufactured by SYMPATEC) with the dispersion pressure of 5.0 bar and the vacuum of 5.0 mbar in the dry dispersion unit, and the mean volume diameter $D_{50}$ determined in the analysis was defined as the mean particle size.

Moisture Content of Microspheres

The moisture content of a sample of microspheres was determined with a Karl Fischer moisture meter (MKA-510N, manufactured by Kyoto Electronics Manufacturing Co., Ltd.).

Encapsulation Ratio of a Blowing Agent in Microspheres 1.0 g of a sample of microspheres was placed in a stainless steel evaporating dish 15 mm deep and 80 mm in diameter, and weighed out (W1). Then 30 mL of DMF was added to uniformly disperse the microspheres. After being left for 24 hours at room temperature, the microspheres were dried under reduced pressure at 130° C. for 2 hours, and the dry weight (W2) was determined. The encapsulation ratio of the blowing agent (CR) was calculated by the following expression:

$$CR(\text{wt \%})=(W1-W2)\,(g)/1.0\,(g)\times100-(\text{Moisture content})(\text{wt \%})$$

where the moisture content was calculated in the method mentioned above.

Determination of the Maximum Expansion Temperature of Heat-Expandable Microspheres The maximum expansion temperature was determined with a DMA (DMA Q800, manufactured by TA Instruments). In an aluminum cup of 4.8 mm deep and 6.0 mm in diameter (5.65 mm in inside diameter), 0.5 mg of a sample of heat-expandable microspheres was placed, and the cup was covered with an aluminum cap of 0.1 mm thick and 5.6 mm in diameter to prepare a test sample. The test sample was set on the device and subjected to the pressure of 0.01 N with the compression unit of the device, and the height of the sample ($H_0$) was measured. The sample was then heated at temperatures elevating at a rate of 10° C./min in the temperature range from 20 to 300° C., being subjected to the pressure of 0.01 N with the compression unit, and the temperature at which the compression unit indicated the highest position (H) was determined as the maximum expansion temperature ($T_m$). The maximum change in the position of the sample ($H_m$) was calculated by the following expression.

$$H_m=H-H_0$$

Gel Fraction of Heat-Expandable Microspheres Immersed in DMF

A sample of heat-expandable microspheres was immersed in DMF for 72 hours to determine the gel fraction of the microspheres.

Specifically, 1.0 g of a sample of heat-expandable microspheres was placed in a 100-mL screw cap vial, and weighed out (W1). The vial was filled with 30 ml of DMF and stood still for 72 hours. Then the vial containing the DMF and microspheres was subjected to centrifugal separation at 2000 rpm for 2 min to separate the heat-expandable microspheres and the solvent. Then the supernatant was removed, and the microspheres remaining in the vial were dried in a vacuum constant-temperature oven to evaporate all of the solvent. Then the vial containing the heat-expandable microspheres was weighed out (W2), and the dry weight of the gel (W) was calculated by subtracting W2 from W1 to calculate the gel fraction of the heat-expandable microspheres.

Gel fraction=(Dry weight of gel ($W$)/weight of polymers in 1 g of the sample of heat-expandable microspheres)×100

Measurement of Loose Bulk Density of Heat-Expandable Microsphere

A stainless cup of 50 mm in diameter and 100 ml in internal volume (V) was weighed out (Wb). A sample of heat-expandable microspheres passed through 24-mesh (JIS) sieve was uniformly poured into the cup 23 cm above the cup until the cup was filled to its brim. Then the microspheres were levelled off and the stainless cup with the microspheres was weighed out (Wa). The loose bulk density ($\rho a$) of the heat-expandable microspheres was calculated by the following expression.

$$\rho a = (Wa - Wb)/V$$

Measurement of Tapped Bulk Density of Heat-Expandable Microspheres

The tapped bulk density ($\rho b$) of the heat-expandable microspheres was measured by pouring additional amount of the heat-expandable microspheres in the cup filled with the heat-expandable microcapsules for measuring the loose bulk density and by tapping the cup to compact the heat-expandable microspheres in the cup. The cup containing the heat-expandable microspheres was repeatedly tapped onto the surface of the testing device (the tapping table) by throwing the cup from a specified height (tapping height) in order to lightly impact the bottom of the cup and compact the heat-expandable microspheres in the cup.

A hollow cylinder having almost the same diameter as that of the stainless cup was attached on the brim of the stainless cup filled with heat-expandable microspheres, and additional heat-expandable microspheres were poured in the cylinder until the microspheres flow out of the cylinder. Then the cup with the cylinder was tapped 180 times repeatedly by throwing the cup 1.8 cm above the surface of the testing device. After the tapping operation, the cylinder was removed, the microspheres were leveled off, and the stainless cup filled with the heat-expandable microspheres was weighed out (Wc). Then the tapped bulk density ($\rho b$) of the heat-expandable microspheres was calculated by the following expression.

$$\rho b = (Wc - Wb)/V$$

The loose bulk density and tapped bulk density mentioned above were measured by a Multi Tester (MT-10001K, supplied by Seishin Enterprise Co., Ltd.).

Measurement of Compressibility Index

The compressibility index indicates the degree of the decrease in the bulk of the heat-expandable microspheres in the cup by the tapping, and is calculated by the following expression.

Compressibility index (%)=100×($\rho b - \rho a$)/$\rho b$

Measurement of Yellowing Index

The yellowing index, $\Delta YI$, of a sample is the difference between the yellowness index, YI, of the sample after heating at 180° C. for 10 min and the yellowness index, YI0, of the standard sample. The yellowness was measured by a Chroma Meter (CR-400, supplied by Konica Minolta, Inc.). The yellowness index and yellowing index were calculated by the following expressions. The standard sample was the white sample for the calibration attached to the Chroma Meter.

Yellowness index (YI)=100(1.2985$X$−1.1335$Z$)/$Y$ where X, Y and Z are the tristimulus values in CIE XYZ color space with the standard illuminant D65

Yellowing index, $\Delta YI = YI - YI0$

Expansion Ratio of a Formed Product

The density of a formed product made of a thermoplastic elastomer composition (D1) and the density of the thermoplastic elastomer composition before the forming (D2) were measured by the liquid substitution method with a precision densimeter AX200 (manufactured by Shimadzu Corporation). The expansion ratio of the formed product was calculated from D1 and D2 by the following expression.

Expansion ratio (times)=D2/D1

True Specific Gravity of the Fine-Particle-Coated Hollow Particles

The true specific gravity of the fine-particle-coated hollow particles (hereinafter simply referred to as "hollow particles") was determined by the liquid substitution method (Archimedean method) with hexane under the atmosphere at 25° C. and 50% RH (relative humidity).

Specifically, an empty 100-mL measuring flask was dried and weighed out ($WB_1$). Then hexane was poured into the weighed measuring flask to accurately form a meniscus, and the measuring flask filled with hexane was weighed out ($WB_2$).

The 100-mL measuring flask was then emptied, dried, and weighed out ($WS_1$). About 50 mL of hollow particles were poured into the weighed measuring flask, and the measuring flask containing the hollow particles was weighed out ($WS_2$). Then hexane was poured into the measuring flask containing the hollow particles to accurately form meniscus without taking bubbles into the hexane, and the flask filled with the hollow particles and hexane was weighed out ($WS_3$). The values, $WB_1$, $WB_2$, $WS_1$, $WS_2$, and $WS_3$, were introduced in the following expression to calculate the true specific gravity (d) of the hollow particles.

$$d=[(WS_2-WS_1)\times(WB_2-WB_1)/100]/[(WB_2-WB_1)-(WS_3-WS_2)]$$

Example 1

Production of Heat-Expandable Microspheres

An aqueous dispersion medium was prepared by adding 116 g of sodium chloride, 40 g of colloidal silica containing 20 wt % of silica, 2 g of polyvinyl pyrolidone, 4 g of 5-% aqueous solution of ethylenediaminetetraaceticacid tetrasodiumsalt and 2 g of 5-% aqueous solution of aluminum chloride to 465 g of deionized water and controlling the pH of the mixture within the range from 2.8 to 3.2.

An oily mixture was prepared by mixing 40 g of acrylonitrile, 100 g of methyl methacrylate, 30 g of acrylic acid, 30 g of methacrylic acid, 0.6 g of trimethylolpropane trimethacrylate, 30 g of isopentane, 30 g of isooctane, and 8 g of di-(2-ethylhexyl) peroxydicarbonate.

The aqueous dispersion medium and the oily mixture were mixed and agitated with a Homo-mixer at 10000 rpm for 2 min to be prepared into an aqueous suspension. Then the aqueous suspension was transferred to a compressive reactor of 1.5-liter capacity, purged with nitrogen, and polymerized at 55° C. for 15 hours by agitating the suspension at 150 rpm under the initial reaction pressure of 0.4 MPa. The resultant polymerization product was filtered and dried to be made into the heat-expandable microspheres A. Then the maximum expansion temperature, gel fraction, loose bulk density, tapped bulk density, compressibility index and yellowing index of the microspheres were measured and shown in Table 1.

The photomicrographs of the heat-expandable microspheres A were taken through a scanning electron microscope (VE-8800, 20-kV acceleration voltage, magnification to 30 times, manufactured by Keyence Corporation). The shapes of the heat-expandable microspheres inspected in the photomicrographs were almost spherical and no concave microspheres were found.

Examples 2 to 13 and Comparative Examples 1 to 4

Production of Heat-Expandable Microspheres

In Examples 2 to 13 and Comparative examples 1 and 2, the heat-expandable microspheres were produced in the same manner as that in Example 1 except that the components of the oily mixture and their amount and polymerization temperature were replaced by those shown in Tables 1 and 2. The heat-expandable microspheres B to E and J to Q were obtained in Examples 2 to 13 and the heat-expandable microspheres F and G were obtained in Comparative examples 1 and 2, respectively. Then the maximum expansion temperature, gel fraction, loose bulk density, tapped bulk density, compressibility index, and yellowing index of those microspheres were measured and shown in Tables 1 and 2.

In Comparative examples 3 and 4, an attempt was made to produce the heat-expandable microspheres in the same manner as that in Example 1 except that the components of the oily mixture and their amount and polymerization temperature were replaced by those shown in Table 1. However, the heat-expandable microspheres could not be produced and the oily mixture solidified in Comparative example 3 and the heat-expandable microspheres I obtained in Comparative example 4 were not expandable.

The photomicrographs of the heat-expandable microspheres B to E, J to Q, F, G, and I were taken through a scanning electron microscope (VE-8800, manufactured by Keyence Corporation) in the same manner as that for the heat-expandable microspheres A with the acceleration voltage of 20 kV and magnification to 30 times. The shapes of the heat-expandable microspheres B to E and J to Q inspected in the photomicrographs were almost spherical and no concave microspheres were found. On the other hand, each of the heat-expandable microspheres F, G and I contained only about 5% of spherical microspheres among concave microspheres constituting the major portion.

Preparation of a Masterbatch

The masterbatches containing the heat-expandable microspheres obtained in the processes mentioned above were prepared. 200 g of the heat-expandable microspheres D obtained in Example 4 and 200 g of ethylene-vinyl acetate copolymer resin (m.p. 61° C.) were melt-mixed in a 0.5-L compressive kneader at 75° C. The heat-expandable microspheres exhibited good workability when mixed with the resin. The resultant mixture was processed into pellets of 3 mm in diameter and 3 mm long to be prepared into the masterbatch D (MB-D) containing 50 wt % of the heat-expandable microspheres D.

The heat-expandable microspheres A to C, E, and J to Q obtained in Examples 1 to 3 and 5 to 13 were prepared into the masterbatches A to C, E, and J to Q in the same manner as that for the masterbatch D. The heat-expandable microspheres also exhibited good workability when mixed with the resin. The heat-expandable microspheres F and G obtained in Comparative examples 1 and 2 were also prepared into the masterbatches F and G in the same manner as that for the masterbatch D.

Manufacture of the Formed Product 94 parts by weight of a low-density polyethylene (DNDV-0405R, produced by the Dow Chemical Company, m.p. 108° C., density 0.914) and 6 parts by weight of the master batch D (MB-D) were uniformly mixed to be prepared into a low-density polyethylene composition.

The low-density polyethylene composition was injection molded at 170° C. with a 85 tf injection molder (J85AD, manufactured by The Japan Steel Works, Ltd., equipped with a shut-off nozzle which controls the expansion of the heat-expandable microspheres in the cylinder to stabilize the lightweight effect) to be manufactured into the formed product D containing foam. The expansion ratio of the resultant formed product was 2.3 times. The yellowing index, ΔYI, of the formed product was measured to be −1.

The masterbatches A to C, E, and J to Q were also prepared into low-density polyethylene compositions in the same manner as that for the masterbatch D. Then the compositions were manufactured into the formed products A to C, E, and J to Q in the same manner as that for the formed product D, and their yellowing indices, ΔYI, were measured and shown in Tables 1 and 2.

Manufacture of the Fine-Particle-Coated Hollow Particles

The mixture of 25 g of the heat-expandable microspheres A produced in Example 1 and 75 g of heavy calcium carbonate (MC-120, manufactured by Asahi Kohmatsu Co., Ltd.) was prepared and transferred in a 2-liter separable flask preheated in a heating mantle up to 90 to 110° C. Then the mixture was agitated with a PTFE stirrer blade (150 mm long) at 600 rpm at a temperature controlled to manufacture fine-particle-coated hollow particles A having a true specific gravity of 0.12±0.03 in about 5 min. The true specific gravity of the resultant fine-particle-coated hollow particles A was 0.09. The yellowing index, ΔYI, of the fine-particle-coated hollow particles A was 18.

The heat-expandable microspheres B to G and J to Q obtained in Examples 2 to 13 and Comparative examples 1 and 2 were also processed into fine-particle-coated hollow particles B to G and J to Q in the same manner as that for the fine-particle-coated hollow particles A.

TABLE 1

| | | | Examples | | | | | Comparative examples | | | |
|---|---|---|---|---|---|---|---|---|---|---|---|
| | | | 1 | 2 | 3 | 4 | 5 | 1 | 2 | 3 | 4 |
| | Heat-expandable microspheres | | A | B | C | D | E | F | G | H | I |
| Oily mixture | Polymerizable monomer | AN | 40 | 45 | 0 | 0 | 0 | 80 | 40 | 20 | 20 |
| | | MAN | 0 | 0 | 0 | 0 | 20 | 0 | 0 | 0 | 0 |
| | | MMA | 100 | 120 | 80 | 120 | 120 | 60 | 100 | 0 | 180 |
| | | EMA | 0 | 0 | 0 | 0 | 0 | 0 | 0 | 0 | 0 |
| | | AA | 30 | 0 | 120 | 20 | 20 | 30 | 30 | 100 | 0 |
| | | MAA | 30 | 35 | 0 | 60 | 40 | 30 | 30 | 80 | 0 |
| | Cross-linking agent | TMP | 0.6 | 0 | 0 | 0 | 0 | 0.6 | 0.6 | 0.6 | 0.6 |
| | | EDMA | 0 | 0.3 | 0 | 0 | 0 | 0 | 0 | 0 | 0 |
| | | 4EG-A | 0 | 0.0 | 0.3 | 0.8 | 0.6 | 0 | 0 | 0 | 0 |
| | Polymerization initiator | OPP | 8 | 3 | 15 | 2 | 0 | 8 | 8 | 8 | 1 |
| | | AIBN | 0 | 0 | 0 | 0 | 8 | 0 | 0 | 0 | 0 |
| | Blowing agent | Isobutane | 0 | 0 | 30 | 0 | 0 | 0 | 60 | 0 | 0 |
| | | Isopentane | 30 | 0 | 0 | 30 | 30 | 30 | 0 | 30 | 30 |
| | | Isohexane | 0 | 40 | 0 | 0 | 0 | 0 | 0 | 0 | 0 |
| | | Isooctane | 30 | 0 | 15 | 30 | 0 | 30 | 0 | 30 | 30 |
| | | Isododecane | 0 | 20 | 15 | 0 | 15 | 0 | 0 | 0 | 0 |
| | | Isohexadecane | 0 | 0 | 0 | 0 | 15 | 0 | 0 | 0 | 0 |
| Aqueous dispersion medium | Deionized water | | 465 | 465 | 465 | 465 | 465 | 465 | 465 | 465 | 465 |
| | Sodium chloride | | 116 | 116 | 116 | 116 | 116 | 116 | 116 | 116 | 116 |
| | Dispersion stabilizer | Colloidal silica (20%) | 40 | 40 | 40 | 40 | 40 | 40 | 40 | 40 | 40 |
| | Dispersion stabilizing auxiliary | Polyvinyl pyrolidone | 2 | 2 | 2 | 2 | 2 | 2 | 2 | 2 | 2 |
| | | 5-% aqueous solution of ethylenediamine tetraacetic acid tetrasodium salt | 4 | 4 | 4 | 4 | 4 | 4 | 4 | 4 | 4 |
| | | 5-% aqueous solution of aluminum chloride | 2 | 2 | 2 | 2 | 2 | 2 | 2 | 2 | 2 |
| | | pH | 3.1 | 3.0 | 3.1 | 2.8 | 3.2 | 3.1 | 3.1 | 3.0 | 2.9 |
| Polymerization step | Mixing parameters | Speed (rpm) | 10000 | 10000 | 10000 | 10000 | 10000 | 10000 | 10000 | 10000 | 10000 |
| | | Time (min) | 2 | 2 | 2 | 2 | 2 | 2 | 2 | 2 | 2 |
| | Reaction parameters | Temperature | 55 | 55 | 55 | 55 | 72 | 55 | 55 | 55 | 55 |
| | | Time | 15 | 15 | 15 | 15 | 15 | 15 | 15 | 15 | 15 |
| Properties of microspheres | Particle size (μm) | | 21 | 22 | 20 | 25 | 21 | 21 | 21 | Solidified | 21 |
| | Moisture content (%) | | 1 | 1 | 1 | 1 | 2 | 1 | 1 | | 1 |
| | Encapsulation ratio (%) | | 18 | 19 | 19 | 20 | 21 | 18 | 18 | | Not expandable |
| | Maximum expansion temp. (° C.) | | 148 | 160 | 136 | 180 | 178 | 145 | 120 | | |
| | Maximum change (μm) | | 1800 | 1500 | 1650 | 2300 | 2000 | 900 | 850 | | |
| | Gel fraction (%) | | 88 | 90 | 88 | 79 | 85 | 95 | 94 | | |
| | Loose bulk density (g/cm³) | | 0.52 | 0.58 | 0.60 | 0.55 | 0.57 | 0.42 | 0.48 | | |
| | Tapped bulk density (g/cm³) | | 0.63 | 0.70 | 0.68 | 0.64 | 0.68 | 0.68 | 0.65 | | |
| | Compressibility index | | 17 | 17 | 12 | 14 | 16 | 38 | 26 | | |
| | Yellowing index (heat-expandable microspheres, @ 180° C., 10 min) | | 20 | 18 | 5 | 2 | 5 | 40 | 35 | | |
| | Yellowing index (formed product) | | 25 | 20 | 2 | −1 | 5 | 38 | 32 | | |
| | Yellowing index (fine-particle-coated hollow particles) | | 18 | 16 | 3 | −3 | 3 | 37 | 33 | | |

TABLE 2

| | | | Examples | | | | | | | |
|---|---|---|---|---|---|---|---|---|---|---|
| | | | 6 | 7 | 8 | 9 | 10 | 11 | 12 | 13 |
| | Heat-expandable microspheres | | J | K | L | M | N | O | P | Q |
| Oily mixture | Polymerizable monomer | AN | 0 | 0 | 0 | 30 | 15 | 0 | 42 | 0 |
| | | MAN | 35 | 0 | 0 | 0 | 15 | 40 | 0 | 0 |
| | | MMA | 40 | 170 | 80 | 100 | 60 | 60 | 70 | 120 |
| | | EMA | 60 | 0 | 0 | 0 | 60 | 0 | 0 | 0 |
| | | AA | 40 | 15 | 0 | 35 | 30 | 0 | 70 | 0 |
| | | MAA | 25 | 15 | 120 | 35 | 20 | 80 | 0 | 60 |
| | | MAAm | 0 | 0 | 0 | 0 | 0 | 20 | 0 | 20 |
| | | PMI | 0 | 0 | 0 | 0 | 0 | 0 | 18 | 0 |
| | Cross-linking agent | TMP | 0.3 | 0.6 | 0 | 0.1 | 0 | 0.6 | 0.0 | 0.6 |
| | | EDMA | 0 | 0 | 0 | 0 | 0.5 | 0.0 | 0.3 | 0.0 |
| | | 4EG-A | 0.3 | 0 | 0.3 | 0 | 0.0 | 0.0 | 0.0 | 0.0 |
| | Polymerization initiator | OPP | 8 | 8 | 20 | 8 | 6 | 8 | 3 | 10 |
| | | AIBN | 0 | 0 | 0 | 0 | 0 | 0 | 0 | 0 |
| | Blowing agent | Isobutane | 0 | 40 | 30 | 0 | 40 | 0 | 0 | 0 |
| | | Isopentane | 10 | 0 | 0 | 20 | 40 | 30 | 0 | 30 |
| | | Isohexane | 0 | 0 | 0 | 0 | 0 | 0 | 40 | 0 |
| | | Isooctane | 40 | 30 | 15 | 80 | 20 | 30 | 0 | 15 |
| | | Isododecane | 0 | 0 | 15 | 0 | 0 | 0 | 20 | 0 |
| | | Isohexadecane | 0 | 0 | 0 | 0 | 0 | 0 | 0 | 15 |
| Aqueous dispersion medium | Deionized water | | 465 | 465 | 465 | 465 | 465 | 465 | 465 | 465 |
| | Sodium chloride | | 116 | 116 | 116 | 116 | 116 | 116 | 116 | 116 |
| | Dispersion stabilizer | Colloidal silica (20%) | 20 | 40 | 40 | 40 | 60 | 40 | 60 | 40 |
| | Dispersion stabilizing auxiliary | Polyvinyl pyrolidone | 2 | 2 | 2 | 2 | 2 | 2 | 2 | 2 |
| | | 5-% aqueous solution of ethylenediamine tetraacetic acid tetrasodium salt | 4 | 4 | 4 | 4 | 4 | 4 | 4 | 4 |
| | | 5-% aqueous solution of aluminum chloride | 2 | 2 | 2 | 2 | 2 | 2 | 2 | 2 |
| | | pH | 3.0 | 3.1 | 3.1 | 3.1 | 3.1 | 3.1 | 3.0 | 3.2 |
| Polymerization step | Mixing parameters | Speed (rpm) | 8000 | 10000 | 10000 | 10000 | 12000 | 10000 | 10000 | 10000 |
| | | Time (min) | 2 | 2 | 2 | 2 | 3 | 2 | 2 | 2 |
| | Reaction parameters | Temperature | 55 | 55 | 55 | 55 | 55 | 55 | 55 | 55 |
| | | Time | 15 | 15 | 15 | 15 | 15 | 15 | 15 | 15 |
| Properties of microspheres | | Particle size (μm) | 50 | 21 | 20 | 22 | 6 | 22 | 8 | 19 |
| | | Moisture content (%) | 3 | 1 | 1 | 1 | 1 | 1 | 1 | 1 |
| | | Encapsulation ratio (%) | 21 | 18 | 19 | 38 | 30 | 17 | 19 | 19 |
| | | Maximum expansion temp. (° C.) | 178 | 128 | 210 | 150 | 115 | 175 | 160 | 200 |
| | | Maximum change (μm) | 3800 | 1800 | 2200 | 3200 | 1200 | 1900 | 1500 | 2000 |
| | | Gel fraction (%) | 85 | 88 | 45 | 86 | 82 | 89 | 90 | 80 |
| | | Loose bulk density (g/cm$^3$) | 0.57 | 0.52 | 0.62 | 0.53 | 0.51 | 0.52 | 0.58 | 0.52 |
| | | Tapped bulk density (g/cm$^3$) | 0.68 | 0.63 | 0.64 | 0.58 | 0.64 | 0.63 | 0.70 | 0.58 |
| | | Compressibility index | 16 | 17 | 3 | 9 | 20 | 25 | 22 | 10 |
| | | Yellowing index (heat-expandable microspheres, @ 180° C., 10 min) | 21 | 8 | 3 | 18 | 19 | 28 | 30 | 6 |
| | | Yellowing index (formed product) | 22 | 4 | 4 | 16 | 20 | 27 | 28 | 5 |
| | | Yellowing index (fine-particle-coated hollow particles) | 20 | 9 | 2 | 14 | 16 | 24 | 29 | 8 |

All of the heat-expandable microspheres of Examples 1 to 13 have almost spherical shape and high expansion performance and exhibit good workability when mixed with a resin. The heat-expandable microspheres exhibited low yellowing indices, ΔYI, low gel fraction and low compressibility index.

On the other hand, the heat-expandable microspheres of Comparative example 1 produced from the polymerizable component containing comparatively high amount of nitrile monomer contain a considerable amount of concave microspheres in the inspection with the microphotographs. The heat-expandable microspheres exhibited high yellowing indices, ΔYI, high gel fraction and high compressibility index.

The heat-expandable microspheres of Comparative example 2 exhibited similar properties to those of the heat-expandable microspheres of Comparative example 1 because of the blowing agent which does not contain a hydrocarbon having 8 or more carbon atoms per molecule. The concave shape of the heat-expandable microspheres of Comparative example 2 is estimated to have been caused from the isobutane used as the blowing agent, which is estimated to have generated excessive vapor pressure in polymerization.

The names of the monomer components, polymerization initiators and cross-linking agents are abbreviated in Tables 1 and 2 as described below. The temperatures in the parentheses are the glass-transition temperature of the homopolymer of each of the monomers.

AN: acrylonitrile (125° C.)
MAN: methacrylonitrile (120° C.)
EMA: ethyl methacrylate (65° C.)
MMA: methyl methacrylate (105° C.)
AA: acrylic acid (106° C.)
MAA: methacrylic acid (228° C.)
MAAm: methacrylamide (165° C.)
PMI: N-phenylmaleimide (100° C. or higher)
TMP: trimethylolpropane trimethacrylate
EDMA: ethyleneglycol dimethacrylate
4EG-A: PEG(400) diacrylate
OPP: di-(2-ethylhexyl) peroxydicarbonate
AIBN: azobisisobutylonitrile

INDUSTRIAL APPLICABILITY

The heat-expandable microspheres of the present invention can be used as a lightweight additive for putties, paints, inks, sealants, mortar, paper clay, ceramic, etc., and also as the additive to base components processed in injection molding, extrusion molding and pressure molding to be made into formed products having excellent sound insulation, thermal insulation, heat-shielding, and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. Heat-expandable microspheres comprising a thermoplastic resin shell and a blowing agent encapsulated therein and vaporizable by heating,
wherein the thermoplastic resin is produced by polymerizing a polymerizable component containing a methacrylate monomer, a carboxyl-containing monomer, and containing no nitrile monomer,
wherein the methacrylate monomer is at least one selected from a methyl methacrylate and an ethyl methacrylate,
wherein the carboxyl-containing monomer is at least one selected from an acrylic acid and a methacrylic acid,
wherein the amount of the methacrylate monomer ranges from 40 to 85 wt % of the total amount of the methacrylate monomer and the carboxyl-containing monomer,
wherein the total amount of the methacrylate monomer and the carboxyl-containing monomer is higher than 90 wt % of the total amount of the polymerizable component,
wherein the blowing agent contains a hydrocarbon having at least 8 carbon atoms per molecule, and
wherein a yellowing index, $\Delta YI$, of the heat-expandable microspheres after heating at 180° C. for 10 min is not higher than 10, the yellowing index is calculated by subtracting the yellowness index of the standard specimen (YI0) from the yellowness index of a sample of the heat-expandable microspheres (YI) which is measured after heating the sample at 180° C. for 10 min.

2. The heat-expandable microspheres as claimed in claim 1, having a compressibility index that is lower than 25%.

3. The heat-expandable microspheres as claimed in claim 1, wherein a gel fraction of the heat-expandable microspheres after being immersed in DMF for 72hours is not higher than 90%.

4. The heat-expandable microspheres as claimed in claim 1, the heat-expandable microspheres having a maximum expansion temperature of at least 100° C.

5. A process for producing heat-expandable microspheres which comprises:
dispersing an oily mixture containing a polymerizable component, a blowing agent and a polymerization initiator in an aqueous dispersion medium, and
polymerizing the polymerizable component,
wherein the polymerizable component contains a methacrylate monomer, a carboxyl-containing monomer, and a cross-linking agent, and contains no nitrile monomer,
wherein the polymerization initiator is at least one selected from a di-(2-ethylhexyl) peroxydicarbonate and an azobisisobutylonitrile,
wherein the methacrylate monomer is at least one selected from a methyl methacrylate and an ethyl methacrylate,
wherein the carboxyl-containing monomer is at least one selected from an acrylic acid and a methacrylic acid,
wherein the amount of the methacrylate monomer ranges from 40 to 85 wt % of the total amount of the methacrylate monomer and the carboxyl-containing monomer,
wherein the cross-linking agent is at least one selected from trimethylolpropane trimethacrylate, PEG (200) diacrylate, PEG (200) dimethacrylate, PEG (400) diacrylate, PEG (600) diacrylate and PEG(600) dimethacrylate,
wherein the total amount of the methacrylate monomer and the carboxyl-containing monomer is higher than 90 wt % of the total amount of the polymerizable component,
wherein the blowing agent contains a hydrocarbon having at least 8 carbon atoms per molecule, and
wherein a yellowing index, $\Delta YI$, of the heat-expandable microspheres after heating at 180° C. for 10 min is not higher than 10, the yellowing index is calculated by subtracting the yellowness index of the standard specimen (YI0) from the yellowness index of a sample of the heat-expandable microspheres (YI) which is measured after heating the sample at 180° C. for 10min.

6. The process for producing the heat-expandable microspheres as claimed in claim 5, wherein the amount of the polymerization initiator ranges from 0.9 to 10 parts by weight to 100 parts by weight of the total amount of the methacrylate monomer and the carboxyl-containing monomer.

7. The process for producing the heat-expandable microspheres as claimed in claim 5, wherein the amount of the cross-linking agent in the polymerizable component ranges from 0 to 0.4 parts by weight to 100 parts by weight of the total amount of the methacrylate monomer and the carboxyl-containing monomer.

8. Hollow particles produced by thermally expanding the heat-expandable microspheres as claimed in claim 1.

9. A composition containing a base component and the heat-expandable microspheres as claimed in claim 1.

10. A formed product produced by forming the composition as claimed in claim 9.

11. Hollow particles produced by thermally expanding the heat-expandable microspheres produced in the process for producing heat-expandable microspheres as claimed in claim 5.

12. The heat-expandable microspheres as claimed in claim 1, wherein the polymerizable component contains a cross-linking agent, and the cross-linking agent is at least one selected from trimethylolpropane trimethacrylate, PEG (200) diacrylate, PEG (200) dimethacrylate, PEG (400) diacrylate, PEG (600) diacrylate and PEG (600) dimethacrylate.

* * * * *